US011808192B2

(12) United States Patent
Norris et al.

(10) Patent No.: US 11,808,192 B2
(45) Date of Patent: Nov. 7, 2023

(54) EXHAUST GAS AFTERTREATMENT SYSTEM

(71) Applicant: Cummins Emission Solutions Inc., Columbus, IN (US)

(72) Inventors: Colin L. Norris, Columbus, IN (US); Matthew Henry, Columbus, IN (US); Stephen W. Caddy, Huddersfield (GB); Randolph G. Zoran, McFarland, WI (US); Stephen M. Holl, Columbus, IN (US); Matthew Robert Brookes, Holmfirth (GB); Jamie Archer, Holmfirth (GB); John M. Clark, Leeds (GB)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 273 days.

(21) Appl. No.: 16/943,812

(22) Filed: Jul. 30, 2020

(65) Prior Publication Data
US 2021/0047957 A1    Feb. 18, 2021

Related U.S. Application Data

(60) Provisional application No. 62/886,495, filed on Aug. 14, 2019.

(51) Int. Cl.
| | |
|---|---|
| *F01N 3/20* | (2006.01) |
| *F02B 37/18* | (2006.01) |
| *B01D 53/94* | (2006.01) |
| *B01F 23/213* | (2022.01) |
| *B01F 25/314* | (2022.01) |
| *B01F 27/112* | (2022.01) |

(52) U.S. Cl.
CPC ....... *F01N 3/2066* (2013.01); *B01D 53/9431* (2013.01); *B01F 23/2132* (2022.01);
(Continued)

(58) Field of Classification Search
CPC ......... F01N 2610/08; F01N 2610/1433; F01N 2610/1453; F01N 2610/14; F01N 2340/06;
(Continued)

(56) References Cited

U.S. PATENT DOCUMENTS

| | | |
|---|---|---|
| 8,312,708 B2 | 11/2012 | Bennet et al. |
| 10,570,796 B2 * | 2/2020 | Kurpejovic ........... F01N 3/2066 |

(Continued)

OTHER PUBLICATIONS

"Cummins shows off new integrated turbocharger and aftertreatment system," Coach & Bus Week, retrieved from https://cbwmagazine.com/cummins-shows-off-new-integrated-turbocharger-and-aftertreatment-system/, posted Jul. 8, 2018, 4 pages.
(Continued)

*Primary Examiner* — Devon C Kramer
*Assistant Examiner* — Kelsey L Stanek
(74) *Attorney, Agent, or Firm* — Foley & Lardner LLP (57) ABSTRACT

An exhaust gas system includes an engine-turbine exhaust gas conduit, a turbocharger, a turbine-housing exhaust gas conduit, an injection housing, a dosing module, and a bypass system. The engine-turbine exhaust gas conduit is configured to receive exhaust gas. The turbocharger includes a turbine. The turbine is coupled to the engine-turbine exhaust gas conduit. The turbine-housing exhaust gas conduit is coupled to the turbine. The injection housing is coupled to the turbine-housing exhaust gas conduit and centered on an injection housing axis. The dosing module is coupled to the injection housing and includes an injector. The injector is configured to dose reductant into the injection housing. The injector is centered on an injector axis. The bypass system includes a bypass inlet conduit, a bypass valve, and a bypass outlet conduit. The bypass inlet conduit is coupled to the engine-turbine exhaust gas conduit.

23 Claims, 7 Drawing Sheets

(52) U.S. Cl.
CPC .......... *B01F 25/314* (2022.01); *B01F 27/112* (2022.01); *F02B 37/183* (2013.01); *B01F 2215/0422* (2013.01); *F01N 2610/08* (2013.01); *F01N 2610/1433* (2013.01); *F01N 2610/1453* (2013.01)

(58) Field of Classification Search
CPC ................ F01N 2610/02; B01F 25/314; B01F 23/2132; B01F 27/112; B01D 53/9431; B01D 2251/2067; F02B 37/183; F02B 37/18; F01F 2215/0422
USPC ......................................... 60/605.1, 276–324
See application file for complete search history.

(56) References Cited

U.S. PATENT DOCUMENTS

| | | | |
|---|---|---|---|
| 2014/0044603 A1* | 2/2014 | Greber | F01N 3/2066 422/171 |
| 2015/0204226 A1 | 7/2015 | Moore | |
| 2016/0010528 A1* | 1/2016 | Light-Holets | F02B 29/0418 60/599 |
| 2016/0166990 A1 | 6/2016 | Phillips et al. | |
| 2017/0089246 A1* | 3/2017 | Greber | F01N 3/2073 |
| 2017/0152783 A1* | 6/2017 | Fukui | F01N 3/20 |
| 2017/0191393 A1 | 7/2017 | Koshy et al. | |
| 2017/0342886 A1* | 11/2017 | Gavin | F01N 3/2066 |
| 2018/0283248 A1* | 10/2018 | Upadhyay | F02D 41/1446 |
| 2020/0088081 A1* | 3/2020 | Rohde | F01N 3/2066 |

OTHER PUBLICATIONS

"Cummins unveils new emission technology concept at the IAA Show," DieselNet: What's New, retrieved from https://dieselnet.com/news/2018/09cummins.php, dated Sep. 22, 2018, 3 pages.

* cited by examiner

EXHAUST GAS AFTERTREATMENT SYSTEM

CROSS-REFERENCE TO RELATED PATENT APPLICATION

This application claims the benefit of U.S. Provisional Application No. 62/886,495, filed Aug. 14, 2019, the entire disclosure of which is incorporated herein by reference.

TECHNICAL FIELD

The present application relates generally to an exhaust gas aftertreatment system for an internal combustion engine.

BACKGROUND

For internal combustion engines, such as diesel engines, nitrogen oxide ($NO_x$) compounds may be emitted in exhaust gas. It may be desirable to reduce $NO_x$ emissions to comply with environmental regulations, for example. To reduce $NO_x$ emissions, a reductant may be dosed into the exhaust gas by a dosing system and within an exhaust gas aftertreatment system. The reductant facilitates conversion of a portion of the exhaust gas into non-$NO_x$ emissions, such as nitrogen ($N_2$), carbon dioxide ($CO_2$), and water ($H_2O$), thereby reducing $NO_x$ emissions.

SUMMARY

In one embodiment, an exhaust gas system includes an engine-turbine exhaust gas conduit, a turbocharger, a turbine-housing exhaust gas conduit, an injection housing, a dosing module, and a bypass system. The engine-turbine exhaust gas conduit is configured to receive exhaust gas. The turbocharger includes a turbine. The turbine is coupled to the engine-turbine exhaust gas conduit. The turbine-housing exhaust gas conduit is coupled to the turbine. The injection housing is coupled to the turbine-housing exhaust gas conduit and centered on an injection housing axis. The dosing module is coupled to the injection housing and includes an injector. The injector is configured to dose reductant into the injection housing. The injector is centered on an injector axis. The bypass system includes a bypass inlet conduit, a bypass valve, and a bypass outlet conduit. The bypass inlet conduit is coupled to the engine-turbine exhaust gas conduit. The bypass valve is coupled to the bypass inlet conduit. The bypass outlet conduit is coupled to the bypass valve and the turbine-housing exhaust gas conduit. The bypass outlet conduit is centered on a bypass outlet conduit axis. The bypass outlet conduit axis does not intersect the injection housing axis.

In another embodiment, an exhaust gas system includes an engine-turbine exhaust gas conduit, a turbocharger, a turbine-housing exhaust gas conduit, an injection housing, a dosing module, and a bypass system. The engine-turbine exhaust gas conduit is configured to receive exhaust gas. The turbocharger includes a turbine. The turbine is coupled to the engine-turbine exhaust gas conduit. The turbine-housing exhaust gas conduit is coupled to the turbine. The injection housing is coupled to the turbine-housing exhaust gas conduit and centered on an injection housing axis. The dosing module is coupled to the injection housing and includes an injector. The injector is configured to dose reductant into the injection housing. The injector is centered on an injector axis. The bypass system includes a bypass inlet conduit, a bypass valve, and a bypass outlet conduit. The bypass inlet conduit is coupled to the engine-turbine exhaust gas conduit. The bypass valve is coupled to the bypass inlet conduit. The bypass outlet conduit is coupled to the bypass valve and the turbine-housing exhaust gas conduit. The bypass outlet conduit is centered on a bypass outlet conduit axis. The injection housing axis is intersected by an injection housing radial plane that is orthogonal to the injection housing axis. The injection housing axis is intersected by a vertical axis that is orthogonal to the injection housing axis and extends along the injection housing radial plane. The injector axis is separated from the vertical axis by a vertical offset angle measured about the injection housing axis, when viewed along the injection housing axis. The vertical offset angle is between 45° and 180°, inclusive.

In another embodiment, an exhaust gas system includes an engine-turbine exhaust gas conduit, a turbocharger, a turbine-housing exhaust gas conduit, an injection housing, a dosing module, and a bypass system. The engine-turbine exhaust gas conduit is configured to receive exhaust gas. The turbocharger includes a turbine. The turbine is coupled to the engine-turbine exhaust gas conduit. The turbine-housing exhaust gas conduit is coupled to the turbine. The injection housing is coupled to the turbine-housing exhaust gas conduit and centered on an injection housing axis. The dosing module is coupled to the injection housing and includes an injector that is configured to dose reductant into the injection housing. The injector is centered on an injector axis. The bypass system includes a bypass inlet conduit, a bypass valve, and a bypass outlet conduit. The bypass inlet conduit is coupled to the engine-turbine exhaust gas conduit. The bypass valve is coupled to the bypass inlet conduit. The bypass outlet conduit is coupled to the bypass valve and the turbine-housing exhaust gas conduit. The bypass outlet conduit is centered on a bypass outlet conduit axis. The injection housing axis is intersected by an injection housing radial plane that is orthogonal to the injection housing axis. The injection housing axis is intersected by a vertical axis that is orthogonal to the injection housing axis and extends along the injection housing radial plane. The bypass outlet conduit axis is separated from the vertical axis by a vertical offset angle measured about the injection housing axis, when viewed along the injection housing axis. The vertical offset angle is between 15° and 345°, inclusive.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the Figures are schematic representations for purposes of illustration. The Figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and for treating exhaust gas of an internal combustion engine. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gas that contains constituents, such as $NO_x$, $N_2$, $CO_2$, and/or $H_2O$. In some applications, an exhaust gas aftertreatment system is utilized to dose the exhaust gas with a reductant so as to reduce $NO_x$ emissions in the exhaust gas. These exhaust gas aftertreatment systems may include a decomposition chamber within which the reductant is provided and mixed with the exhaust gas.

Exhaust gas aftertreatment systems are defined by a space claim. The space claim is the amount of physical space that an exhaust gas aftertreatment system consumes when installed (e.g., on a vehicle, etc.) and the location (e.g., coordinates relative to a vehicle coordinate system, etc.) of the physical space that is consumed by the exhaust gas aftertreatment system when installed. In some applications, the physical space available for use by an exhaust gas aftertreatment system is limited due to the locations of surrounding components, wiring or piping requirements, or other similar constraints. As such, it is often difficult to modify an exhaust gas aftertreatment system because such modifications typically increase the space claim of the exhaust gas aftertreatment system. Such modifications may be desired when it is desired to utilize various components, such as different types of dosing modules, in the exhaust gas aftertreatment system.

Implementations described herein are related to an exhaust gas aftertreatment system for an exhaust gas system with a turbocharger having a turbine which causes exhaust gas to swirl downstream of the turbine. Some turbines cause swirl that changes direction depending on turbine operating points. Furthermore, the swirl produced by a turbine can have localized portions that have a different direction and/or magnitude than other portions of the swirl.

The exhaust gas aftertreatment system described herein includes an injection housing which is located immediately downstream of the turbine, so as to receive the swirling exhaust gas produced by the turbine. The injection housing includes a dosing module having an injector which provides the exhaust gas within the injection housing with reductant. The swirling of the exhaust gas caused by the turbine, and harnessed due to the location of the injection housing, enhances mixing of the reductant and the exhaust gas. The mixture of the reductant and the exhaust gas is provided to a catalyst which is located immediately downstream of the injection housing. Through this arrangement, the use of additional mixers to cause swirling of the exhaust gas is eliminated.

Implementations herein also include a bypass system which receives exhaust gas from upstream of the turbine and selectively routes that exhaust gas around the turbine and into the injection housing. The arrangement of the bypass outlet conduit which provides this exhaust gas into the injection housing can be selected so as to enhance the swirling produced by the turbine. Specifically, axes upon which the injector and bypass outlet conduit are centered on can be variously angled and separated so as to facilitate desired mixing of the reductant and exhaust gas prior to the catalyst.

II. Example Exhaust Gas Aftertreatment System

Figure 1:
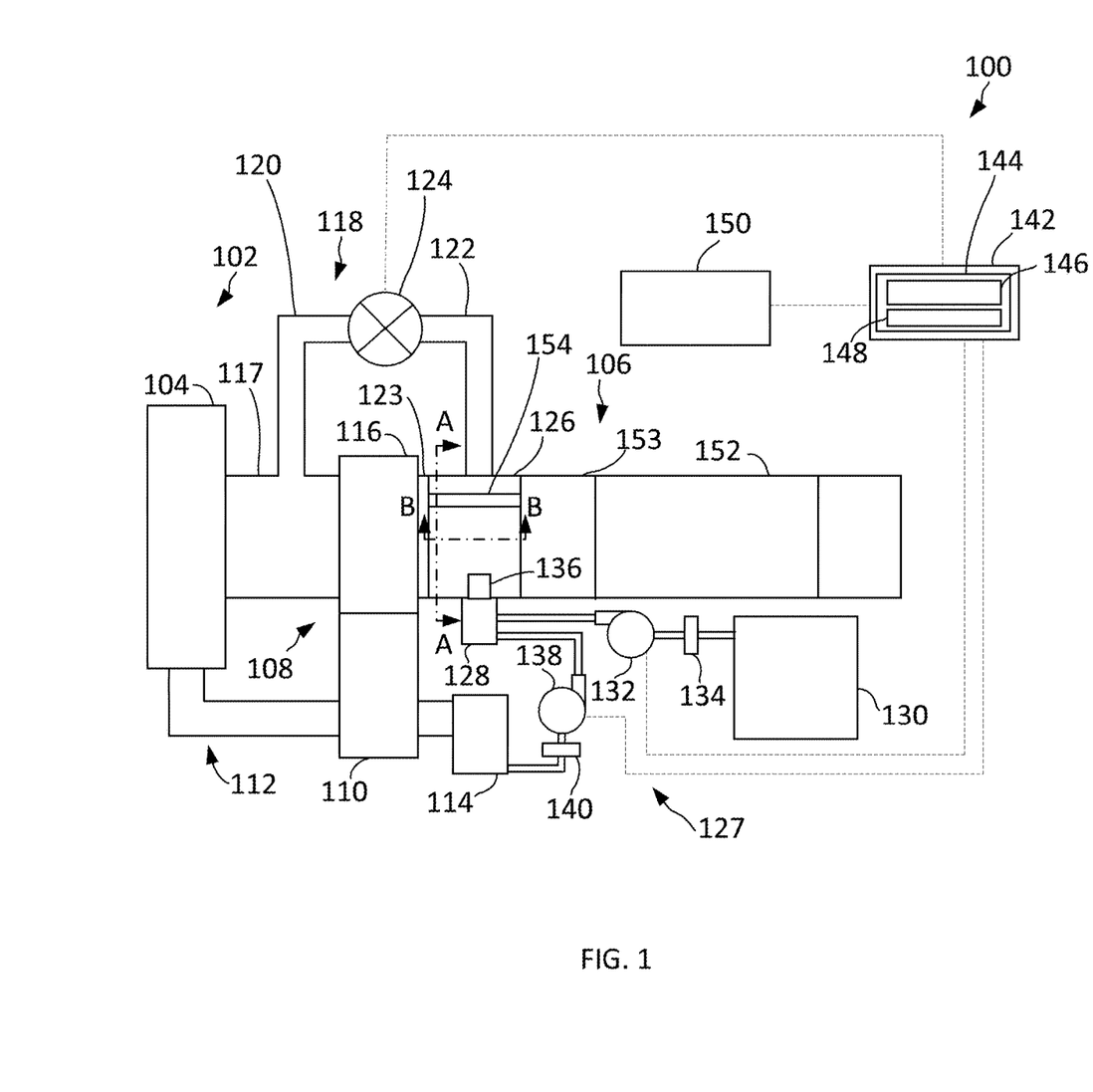
FIG. 1 is a block schematic diagram of an example exhaust gas aftertreatment system for an exhaust gas system.

FIG. 1 depicts an example exhaust gas aftertreatment system 100 for an exhaust gas system 102. The exhaust gas system 102 may be implemented in a vehicle (e.g., truck, car, construction vehicle, military vehicle, commercial vehicle, etc.), a maritime vessel (e.g., ship, barge, boat, etc.), a generator, an aircraft (e.g., plane, jet, etc.), or other similar system. The exhaust gas system 102 includes an internal combustion engine 104 (e.g., diesel internal combustion engine, diesel hybrid internal combustion engine, gasoline internal combustion engine, petrol internal combustion engine, liquid propane internal combustion engine, etc.) and an exhaust gas conduit system 106 which receives exhaust gas from the internal combustion engine 104 and provides the exhaust gas to atmosphere.

The exhaust gas system 102 also includes a turbocharger 108. The turbocharger 108 has a compressor 110 which receives air from an air conduit system 112 and provides the air to the internal combustion engine 104. The air conduit system 112 receives the air from an air source 114 (e.g., air intake, atmosphere, air cooler, etc.). The turbocharger 108 also includes a turbine 116 which receives the exhaust gas from the internal combustion engine 104 via an engine-turbine exhaust gas conduit 117 of the exhaust gas conduit system 106. The turbine 116 harnesses energy in the exhaust gas and provides that energy to the compressor 110 which consumes that energy in order to compress the air provided to the internal combustion engine 104. Through the use of the turbocharger 108, power and/or efficiency of the internal combustion engine 104 may be increased.

As the exhaust gas exits the turbine 116, the exhaust gas is caused to swirl within the exhaust gas conduit system 106. For example, the turbine 116 may include a plurality of vanes (e.g., guides, blades, etc.) on a rotating hub, the vanes being shaped so as to cause the exhaust gas to swirl as the exhaust gas flows out of the turbine 116 and into the exhaust gas conduit system 106. The swirl produced by the turbine 116 continues within the exhaust gas conduit system 106 downstream of the turbine 116. In some embodiments, the vanes of the turbine 116 are shaped to enhance (e.g., increase, amplify, etc.) the swirl produced by the turbine 116.

The exhaust gas aftertreatment system 100 also includes a bypass system 118. The bypass system 118 includes a bypass inlet conduit 120 (e.g., upstream bypass conduit, etc.) that is coupled to the engine-turbine exhaust gas conduit 117. The bypass system 118 also includes a bypass outlet conduit 122 (e.g., downstream bypass conduit, etc.) that is coupled to a turbine-housing exhaust gas conduit 123. The bypass system 118 also includes a bypass valve 124 (e.g., control valve, solenoid valve, electronically controllable valve, ball valve, etc.). The bypass valve 124 is coupled to the bypass inlet conduit 120 and the bypass outlet conduit 122 and is operable (e.g., selectively repositionable, etc.) between a first position, where flow of the exhaust gas from the bypass inlet conduit 120 to the bypass outlet conduit 122 is facilitated, and a second position, where flow of the exhaust gas from the bypass inlet conduit 120 to the bypass outlet conduit 122 is prohibited (e.g., blocked, prevented, etc.).

The exhaust gas aftertreatment system 100 also includes an injection housing 126 (e.g., conduit, decomposition reactor, reactor pipe, decomposition tube, reactor tube, etc.). The injection housing 126 is located immediately downstream of the turbine 116 and is coupled to the bypass outlet conduit 122. As a result, the injection housing 126 receives exhaust gas that has flowed out of the turbine 116, and therefore has the swirl imparted by the turbine 116, as well as exhaust gas that has not flowed through the turbine 116 and instead has bypassed the turbine 116 via the bypass outlet conduit 122, when the bypass valve 124 is not in the second position (e.g., when the bypass valve 124 is in the first position, when the bypass valve 124 is between the first position and the second position, etc.). In various embodiments, the injection housing 126 is coupled to the internal combustion engine 104 and/or turbocharger 108 (e.g., via a mounting bracket, etc.). In some embodiments, the bypass outlet conduit 122 is shaped, angled, or otherwise configured to enhance the swirl of the exhaust gas within the injection housing 126.

In various embodiments, the bypass inlet conduit 120, the bypass outlet conduit 122, and the bypass valve 124 are separate from the turbine 116. In these embodiments, the bypass inlet conduit 120 is not coupled to the turbine 116, except via the engine-turbine exhaust gas conduit 117, the bypass outlet conduit 122 is not coupled to the turbine 116, except via the injection housing 126, and the bypass valve 124 is not coupled to the turbine 116. In such embodiments, the bypass inlet conduit 120 may be decoupled from the engine-turbine exhaust gas conduit 117 without decoupling the turbine 116 from the engine-turbine exhaust gas conduit 117, the bypass outlet conduit 122 may be decoupled from the injection housing 126 without decoupling the turbine 116 from the injection housing 126, and the bypass valve 124 may be decoupled from the bypass inlet conduit 120 and the bypass outlet conduit 122 without decoupling the turbine 116 from the engine-turbine exhaust gas conduit 117 or the injection housing 126.

In various embodiments, the bypass inlet conduit 120, the bypass outlet conduit 122, and the bypass valve 124 are coupled to the turbine 116. In some embodiments, the bypass inlet conduit 120, the bypass outlet conduit 122, and the bypass valve 124 are coupled to the turbine 116 along an external surface (e.g., housing, etc.) of the turbine 116. In other embodiments, the bypass inlet conduit 120, the bypass outlet conduit 122, and the bypass valve 124 are integrated within the turbine 116. In these embodiments, the bypass inlet conduit 120, the bypass outlet conduit 122, and the bypass valve 124 are positioned along a first channel (e.g., volute, etc.) in the turbine 116 such that the exhaust gas is configured to pass from the engine-turbine exhaust gas conduit 117 to the injection housing 126 through the first channel, and the exhaust gas passes from the engine-turbine exhaust gas conduit 117 to the injection housing 126 through a second channel (e.g., volute, etc.) in the turbine 116 that is separated from the first channel. In such embodiments, decoupling the turbine 116 from the engine-turbine exhaust gas conduit 117 simultaneously decouples the bypass inlet conduit 120 from the engine-turbine exhaust gas conduit 117 and decoupling the turbine 116 from the injection housing 126 simultaneously decouples the bypass outlet conduit 122 from the injection housing 126. In some embodiments, the bypass valve 124 is configured to be decoupled from the turbine 116 independent of the bypass inlet conduit 120 and the bypass outlet conduit 122 (e.g., for servicing of the bypass valve 124, etc.).

The exhaust gas aftertreatment system also includes a reductant delivery system 127. The reductant delivery system 127 also includes a dosing module 128 (e.g., doser, etc.) that is coupled to the injection housing 126 and configured to dose reductant into the injection housing 126. The reductant may be, for example, urea, diesel exhaust fluid (DEF), Adblue®, a urea water solution (UWS), an aqueous urea solution (e.g., AUS32, etc.), liquid hydrocarbons, and other similar fluids. As is explained in more detail herein, the injection housing 126 is configured such that heat transfer to the dosing module 128 is minimized. In this way, use of auxiliary cooling conduits to cool the dosing module 128 may be eliminated. The dosing module 128 may include an insulator (e.g., thermal insulator, vibrational insulator, etc.) interposed between a portion of the dosing module 128 and the portion of the injection housing 126 on which the dosing module 128 is mounted.

The dosing module 128 is fluidly coupled to a reductant source 130. The reductant source 130 may include multiple reductant sources 130. The reductant source 130 may be, for example, a diesel exhaust fluid tank containing Adblue®. A reductant pump 132 (e.g., supply unit, etc.) is used to pressurize the reductant from the reductant source 130 for delivery to the dosing module 128. In some embodiments, the reductant pump 132 is pressure controlled (e.g., controlled to obtain a target pressure, etc.).

The reductant pump 132 includes a reductant filter 134. The reductant filter 134 filters (e.g., strains, etc.) the reductant prior to the reductant being provided to internal components (e.g., pistons, vanes, etc.) of the reductant pump 132. For example, the reductant filter 134 may inhibit or prevent the transmission of solids (e.g., solidified reductant, contaminants, etc.) to the internal components of the reductant pump 132. In this way, the reductant filter 134 may facilitate prolonged desirable operation of the reductant pump 132. In some embodiments, the reductant pump 132 is coupled to (e.g., attached to, fixed to, welded to, integrated with, etc.) a chassis of a vehicle associated with the exhaust gas aftertreatment system 100.

The dosing module 128 includes at least one injector 136. Each injector 136 is configured to dose the reductant into the exhaust gas (e.g., within the injection housing 126, etc.). In some embodiments, the reductant delivery system 127 also includes an air pump 138. In these embodiments, the air pump 138 draws air from the air source 114. The air may be drawn through an air filter 140 disposed upstream of the air pump 138. Additionally, the air pump 138 provides the air to the dosing module 128 via a conduit. In these embodiments, the dosing module 128 is configured to mix the air and the reductant into an air-reductant mixture and to provide the air-reductant mixture into the injection housing 126. In other embodiments, the reductant delivery system 127 does not include the air pump 138. In such embodiments, the dosing module 128 is not configured to mix the reductant with air.

In various embodiments, the dosing module 128 is coupled to the injection housing 126 at a location other than a top surface (e.g., relative to a ground surface upon which the exhaust gas system 100 is located, etc.) of the injection housing 126. For example, the dosing module 128 may be coupled to the injection housing 126 at between 45° and 180° relative to a vertical axis (i.e., an axis in the direction of gravity, etc.). In this way, the dosing module 128 may be removed from heat which accumulates and/or builds along the top surface of the injection housing 126 due to the inherent rising of heat (e.g., within air, along the injection housing 126, etc.).

As utilized herein, "axis" does not require a circular cross-sectional shape. Accordingly, a shape that is centered on an axis may have a cross-sectional shape, when taken along a plane orthogonal to the axis, that is circular, elliptical, oval, square, rectangular, triangular, polygonal, or otherwise similarly shaped.

The dosing module 128 and the reductant pump 132 are also electrically or communicatively coupled to a reductant delivery system controller 142. The reductant delivery system controller 142 is configured to control the dosing module 128 to dose the reductant into the injection housing 126. The reductant delivery system controller 142 may also be configured to control the reductant pump 132.

The reductant delivery system controller 142 includes a processing circuit 144. The processing circuit 144 includes a processor 146 and a memory 148. The processor 146 may include a microprocessor, an application-specific integrated circuit (ASIC), a field-programmable gate array (FPGA), etc., or combinations thereof. The memory 148 may include, but is not limited to, electronic, optical, magnetic, or any other storage or transmission device capable of providing a processor, ASIC, FPGA, etc. with program instructions. This memory 148 may include a memory chip, Electrically Erasable Programmable Read-Only Memory (EEPROM), Erasable Programmable Read Only Memory (EPROM), flash memory, or any other suitable memory from which the reductant delivery system controller 142 can read instructions. The instructions may include code from any suitable programming language. The memory 148 may include various modules that include instructions which are configured to be implemented by the processor 146.

In various embodiments, the reductant delivery system controller 142 is configured to communicate with a central controller 150 (e.g., engine control unit (ECU), engine control module (ECM), etc.) of an internal combustion engine having the exhaust gas aftertreatment system 100. In some embodiments, the central controller 150 and the reductant delivery system controller 142 are integrated into a single controller.

In some embodiments, the central controller 150 is communicable with a display device (e.g., screen, monitor, touch screen, heads up display (HUD), indicator light, etc.). The display device may be configured to change state in response to receiving information from the central controller 150. For example, the display device may be configured to change between a static state (e.g., displaying a green light, displaying a "SYSTEM OK" message, etc.) and an alarm state (e.g., displaying a blinking red light, displaying a "SERVICE NEEDED" message, etc.) based on a communication from the central controller 150. By changing state, the display device may provide an indication to a user (e.g., operator, etc.) of a status (e.g., operation, in need of service, etc.) of the reductant delivery system 127.

The exhaust gas aftertreatment system 100 also includes a selective catalytic reduction (SCR) catalyst member 152. The SCR catalyst member 152 is coupled to a housing-catalyst exhaust gas conduit 153 which is coupled to the injection housing 126. The SCR catalyst member 152 is in close proximity to the turbine 116. As a result, the reductant is injected by the injector 136 upstream of the SCR catalyst member 152 such that the SCR catalyst member 152 receives a mixture of the reductant and exhaust gas. The reductant droplets undergo the processes of evaporation, thermolysis, and hydrolysis to form non-$NO_x$ emissions (e.g., gaseous ammonia, etc.) within the injection housing 126, the SCR catalyst member 152, and/or the exhaust gas conduit system 106. The SCR catalyst member 152 is configured to assist in the reduction of $NO_x$ emissions by accelerating a $NO_x$ reduction process between the reductant and the $NO_x$ of the exhaust gas into diatomic nitrogen, water, and/or carbon dioxide.

By being mounted in close proximity to the turbine 116, the SCR catalyst member 152 is provided with relatively high temperature exhaust gas, when compared to other aftertreatment systems where catalysts are mounted further downstream. Due to being exposed to this relatively high temperature exhaust gas, the SCR catalyst member 152 is configured to transition (e.g., warm up, etc.) from ambient temperature (e.g., when the internal combustion engine 104 is not producing exhaust gas, etc.) to an operating temperature significantly more quickly than catalysts in other aftertreatment systems where catalysts are mounted further downstream. Prior to reaching the operating temperature, a catalyst may not desirably assist in the reduction of $NO_x$ emissions. As a result of the SCR catalyst member 152 being mounted in close proximity to the turbine 116, the exhaust gas aftertreatment system 100 is more desirable than other aftertreatment systems where catalysts are mounted further downstream.

Additionally, mounting the SCR catalyst member 152 in close proximity to the turbine 116 enables an overall packaging size of the exhaust gas aftertreatment system 100 to be less than other aftertreatment systems where catalysts are mounted further downstream.

Similarly, by utilizing the swirl produced by the turbine 116 and/or the injection housing 126, the exhaust gas aftertreatment system 100 does not necessarily require the use of a mixer (e.g., mixing device, etc.) upstream of the SCR catalyst member 152. As a result, the backpressure, as well as the complexity and cost, of the exhaust gas aftertreatment system 100 is decreased competed to other aftertreatment systems which utilize mixers upstream of the catalyst. By decreasing backpressure, efficiency and/or performance of the internal combustion engine 104 is increased.

The injection housing 126 may also include heat shields positioned around the dosing module 128 and/or the injector 136. The heat shields may mitigate transmission of heat to the dosing module 128 and/or the injector 136.

The exhaust gas aftertreatment system 100 may further include an oxidation catalyst (e.g., a diesel oxidation catalyst (DOC)) fluidly coupled to the exhaust gas conduit system 106 (e.g., downstream of the SCR catalyst member 152, upstream of the injection housing 126, upstream of the turbine 116, etc.) to oxidize hydrocarbons and carbon monoxide in the exhaust gas.

The injection housing 126 further includes a flow guide 154. The flow guide 154 extends across the injection housing 126 proximate the bypass outlet conduit 122 such that the flow guide 154 is located within, or adjacent to, the exhaust gas provided by the bypass outlet conduit 122 into the injection housing 126. The flow guide 154 is configured to enhance the swirl of the exhaust gas provided by the bypass outlet conduit 122 into the injection housing 126. In some embodiments, the flow guide 154 has an aerofoil (e.g., airfoil, louvered, etc.) shape when viewed in cross-section along a plane such that a first axis upon which the bypass outlet conduit 122 is centered extends along the plane, a second axis upon which the injection housing 126 is centered extends along the plane, a leading edge of the flow guide 154 disposed proximate the bypass outlet conduit 122, and a trailing edge of the flow guide 154 opposite the leading edge.

The exhaust gas aftertreatment system 100 may further include a particulate filter (e.g., a diesel particulate filter (DPF)) fluidly coupled to the exhaust gas conduit system 106 (e.g., downstream of the SCR catalyst member 152, upstream of the injection housing 126, upstream of the turbine 116, etc.) to remove particulate matter, such as soot, from exhaust gas flowing in the exhaust gas conduit system 106.

While the exhaust gas aftertreatment system 100 has been shown and described in the context of use with a diesel internal combustion engine, it is understood that the exhaust gas aftertreatment system 100 may be used with other internal combustion engines, such as gasoline internal combustion engines, hybrid internal combustion engines, propane internal combustion engines, and other similar internal combustion engines.

III. Example Injection Housing

FIGS. 2-9 illustrate a cross-sectional view of the injection housing 126 taken along plane A-A in FIG. 1, according to various embodiments. The injection housing 126 is centered on an injection housing axis 200. For example, the injection housing 126 is cylindrical in various embodiments, and the injection housing axis 200 extends along a center of the cylinder. The injection housing 126 is bisected by an injection housing radial plane 201 that intersects the injection housing axis 200 and is orthogonal to the injection housing axis 200.

The bypass outlet conduit 122 is centered on a bypass outlet conduit axis 202. For example, the bypass outlet conduit 122 is cylindrical in various embodiments, and the bypass outlet conduit axis 202 extends along a center of the cylinder. The bypass outlet conduit 122 is configured to provide the exhaust gas into the injection housing 126 along the bypass outlet conduit axis 202.

The injector 136 is centered on an injector axis 204. For example, the injector 136 is cylindrical in various embodiments, and the injector axis 204 extends along a center of the cylinder. The injector 136 is configured to provide the reductant into the injection housing 126 along the injector axis 204.

The injection housing 126 is bisected by a vertical axis 205 that intersects the injection housing axis 200, is orthogonal to the injection housing axis 200, and extends along the injection housing radial plane 201. The vertical axis 205 is orthogonal to a ground surface upon which the exhaust gas system 100 is located. The injector axis 204 is separated from the vertical axis 205 by a vertical offset angle σ that is measured about the injection housing axis 200 (e.g., with the injection housing axis 200 being the point along which an angular measurement is determined, etc.) when viewed along the injection housing axis 200 (e.g., when viewed in a cross-sectional view taken along the injection housing radial plane 201, when viewed in a cross-sectional view taken along a plane parallel to the injection housing radial plane 201, etc.). The vertical offset angle σ may be present regardless of whether or not the injector axis 204 and the injection housing axis 200 extend along the same plane, that plane being parallel to the injection housing radial plane 201. In various embodiments, the vertical offset angle σ is between 45° and 180°, inclusive. The vertical offset angle σ is defined such that a vertical offset angle σ of 0° corresponds with a location along a top surface of the injection housing 126, and a vertical offset angle σ of 180° corresponds with a location along a bottom surface of the injection housing 126 (e.g., opposite the top surface of the injection housing 126, etc.). By being located such that the vertical offset angle σ is not 0°, such as if the vertical offset angle σ is between 45° and 180°, inclusive, the dosing module 128 may be removed from heat which accumulates and/or builds along the top surface of the injection housing 126 due to the inherent rising of heat (e.g., within air, along the injection housing 126, etc.).

The injection housing 126 is configured to utilize the swirl produced by the turbine 116 to mix the reductant provided by the injector 136. In some embodiments, the injection housing 126 utilizes the exhaust gas flowing from the bypass outlet conduit 122 to enhance the swirl produced by the turbine 116, such as by directing the bypass outlet conduit axis 202 along a tangent of the injection housing 126, and therefore along a tangent of the swirl flowing within the injection housing 126. In some embodiments, the injection housing 126 directs (e.g., arms, etc.) the reductant provided by the injector 136 along a tangent of the injection housing 126, and therefore along a tangent of the swirl flowing within the injection housing 126. In some embodiments, the injection housing 126 is configured such that the bypass outlet conduit axis 202 is not directed at the injector 136. As a result, heat provided by the exhaust gas flowing from the bypass outlet conduit axis 202 may not be directly transferred to the injector 136.

Figure 2:
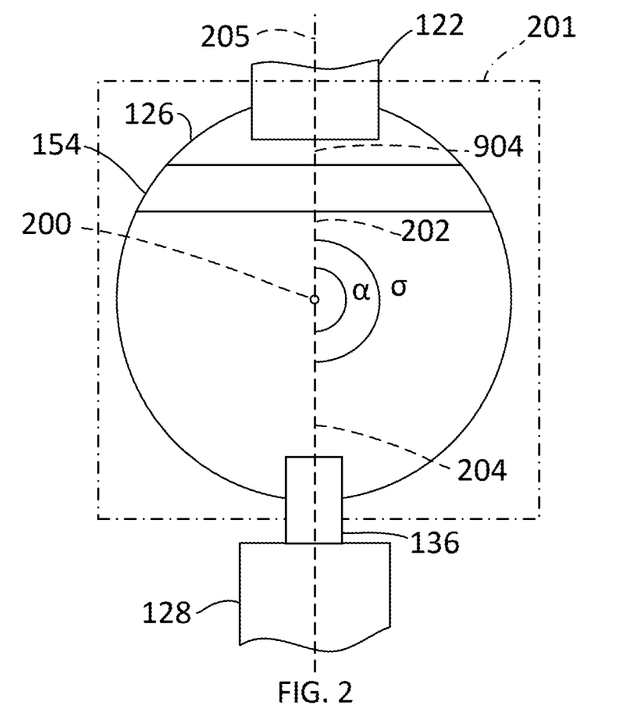
FIG. 2 is a cross-sectional view of an example injection housing of the exhaust gas aftertreatment system shown in FIG. 1, taken along plane A-A.
Figure 3:
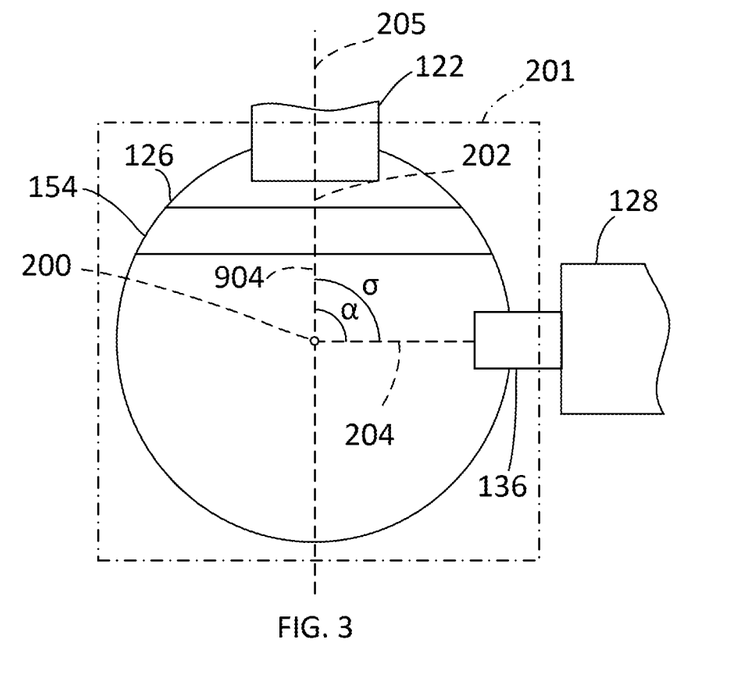
FIG. 3 is a cross-sectional view of an example injection housing of the exhaust gas aftertreatment system shown in FIG. 1, taken along plane A-A.

In various embodiments, such as shown in FIG. 2, the bypass outlet conduit axis 202 extends through the injection housing axis 200 and the injector axis 204 also extends through the injection housing axis 200. In FIG. 2, the bypass outlet conduit axis 202 and the injector axis 204 extend along the injection housing radial plane 201 such that the bypass outlet conduit axis 202 is separated from the injection housing axis 200 by a radial angle α when viewed along the injection housing axis 200 (e.g., when viewed in a cross-sectional view taken along the injection housing radial plane 201, when viewed in a cross-sectional view taken along a plane parallel to the injection housing radial plane 201, etc.). The radial angle α may be present regardless of whether or not the bypass outlet conduit axis 202 and the injection housing axis 200 extend along the same plane, that plane being parallel to the injection housing radial plane 201. In various embodiments, the radial angle α is between approximately (e.g., within 5% of, etc.) 45° and 180°, inclusive (e.g., including 45° and including 180°, etc.). FIG. 3 illustrates the injection housing 126 with the radial angle α being approximately equal to 45°. In some embodiments, the radial angle α is approximately 0°. In these embodiments, the dosing module 128 and the bypass outlet conduit 122 are staggered along a length of the injection housing 126. In other embodiments, the radial angle α is between approximately 45 and 135°, inclusive (e.g., including 45° and including 135°, etc.). In other embodiments, the radial angle α is between approximately 0° and 45°, inclusive (e.g., including 0° and including 45°, etc.). The radial angle α is defined such that a radial angle α of 0° corresponds with a location along a bottom surface of the injection housing 126, and a radial angle α of 180° corresponds with a location along a top surface of the injection housing 126 (e.g., opposite the bottom surface of the injection housing 126, etc.).

In various embodiments, the injector axis 204 extends through the injection housing axis 200 but the bypass outlet conduit axis 202 does not extend through the injection housing axis 200.

Figure 4:
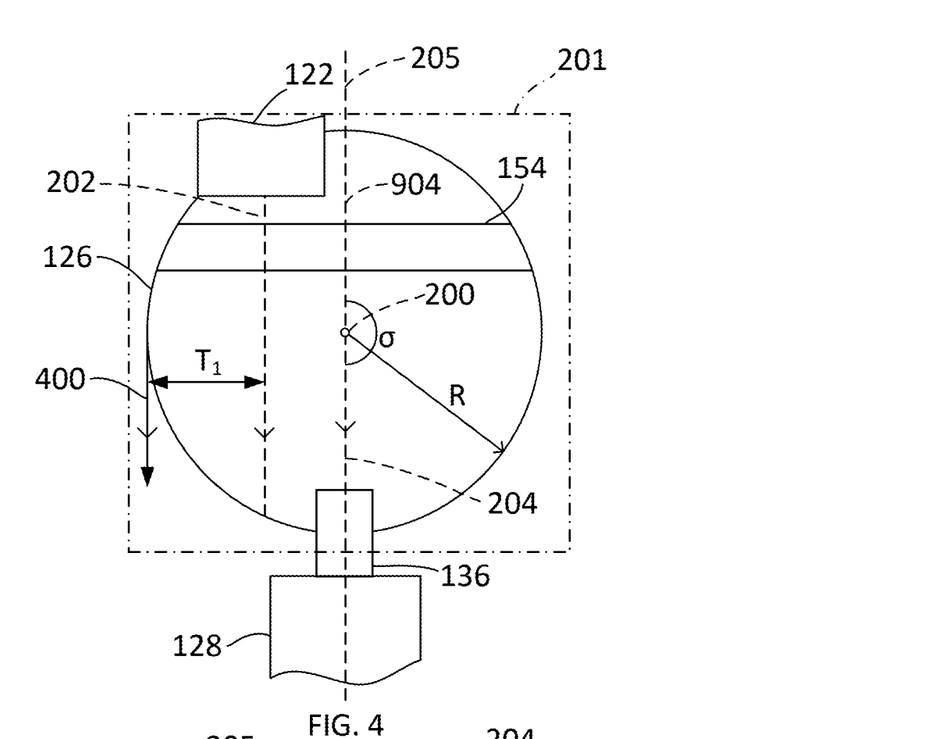
FIG. 4 is a cross-sectional view of an example injection housing of the exhaust gas aftertreatment system shown in FIG. 1, taken along plane A-A.

In some of these embodiments, such as is shown in FIG. 4, the bypass outlet conduit axis 202 is parallel to the injector axis 204. Where the injection housing 126 is cylindrical, the bypass outlet conduit axis 202 extends parallel to a first tangent 400 of the injection housing 126. The bypass outlet conduit axis 202 is separated from the first tangent 400 by a first radial distance $T_1$. Where the injection housing 126 is defined by a radius R, the first radial distance $T_1$ is between approximately 0 and 0.9R, inclusive.

Figure 5:
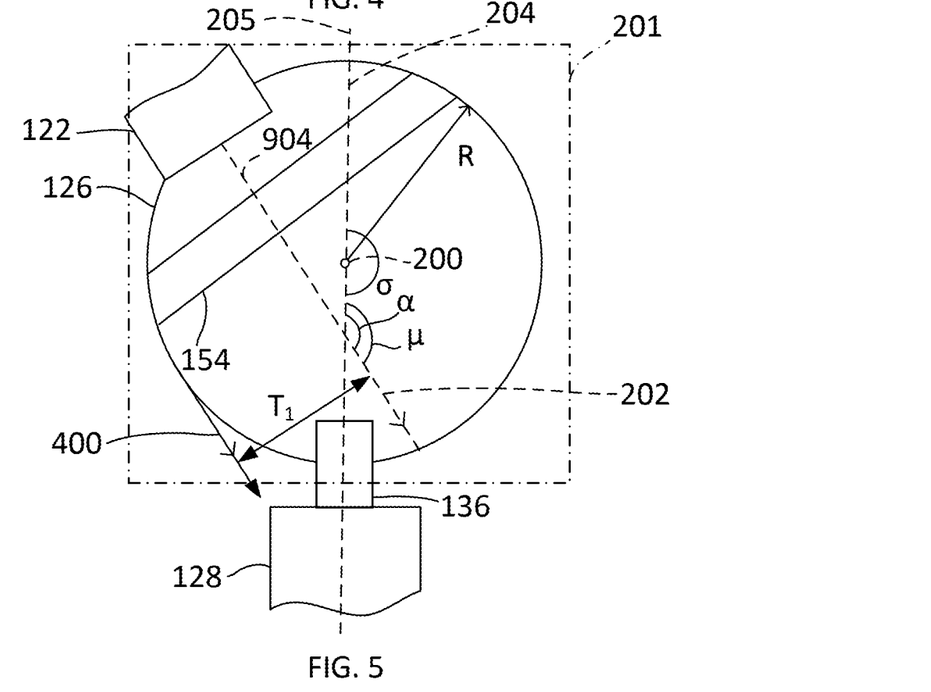
FIG. 5 is a cross-sectional view of an example injection housing of the exhaust gas aftertreatment system shown in FIG. 1, taken along plane A-A.

In others of these embodiments, such as is shown in FIG. 5, the bypass outlet conduit axis 202 intersects the injector axis 204 and is separated from the injector axis 204 by the radial angle α and from the first tangent 400 by the first radial distance $T_1$. The intersection between the injector axis 204 and the bypass outlet conduit axis 202 may occur within the injection housing 126 or outside of the injection housing 126.

In various embodiments, the injector axis 204 does not extend through the injection housing axis 200 and the bypass outlet conduit axis 202 does not extend through the injection housing axis 200.

Figure 6:
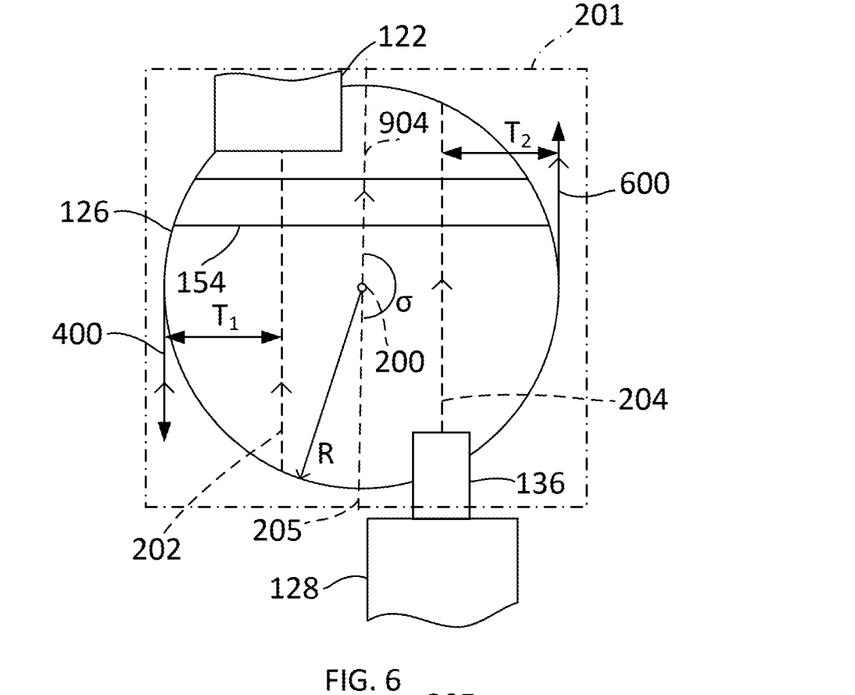
FIG. 6 is a cross-sectional view of an example injection housing of the exhaust gas aftertreatment system shown in FIG. 1, taken along plane A-A.

In some of these embodiments, such as is shown in FIG. 6, the bypass outlet conduit axis 202 is parallel to the injector axis 204. Where the injection housing 126 is cylindrical, the injector axis 204 extends parallel to a second tangent 600 of the injection housing 126. The injector axis 204 is separated from the second tangent 600 by a second radial distance $T_2$. Where the injection housing 126 is defined by the R, the second radial distance $T_2$ is between approximately 0 and 0.9R, inclusive. The second radial distance $T_2$ may be approximately equal to the first radial distance $T_1$, in some embodiments.

Figure 7:
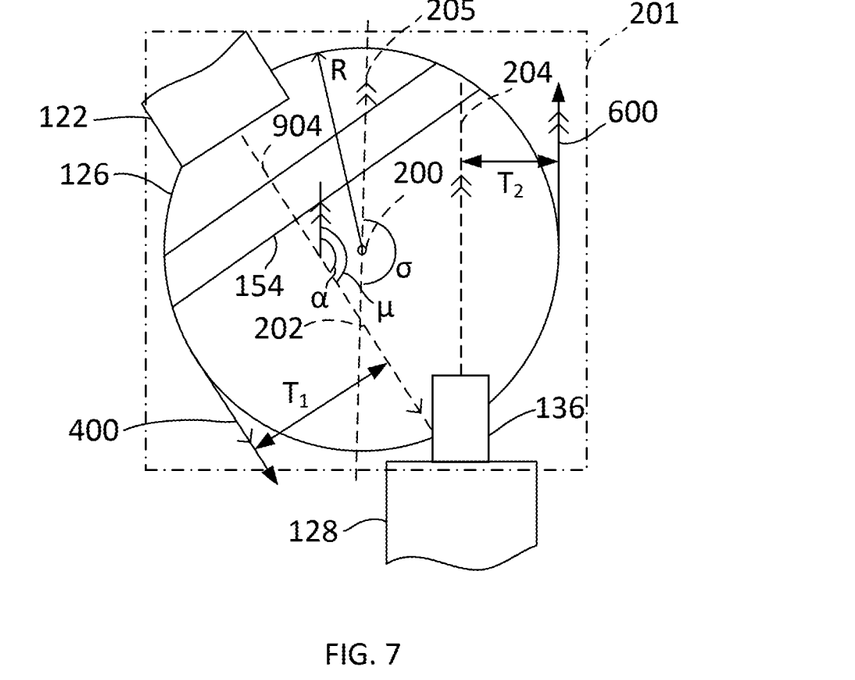
FIG. 7 is a cross-sectional view of an example injection housing of the exhaust gas aftertreatment system shown in FIG. 1, taken along plane A-A.

In others of these embodiments, such as is shown in FIG. 7, the bypass outlet conduit axis 202 is separated from the injector axis 204 by the radial angle α and from the first tangent 400 by the first radial distance $T_1$ and the injector axis 204 is separated from the second tangent 600 by the second radial distance $T_2$. The intersection between the injector axis 204 and the bypass outlet conduit axis 202 may occur within the injection housing 126 or outside of the injection housing 126.

In various embodiments, the injector axis 204 does not extend through the injection housing axis 200 but the bypass outlet conduit axis 202 extends through the injection housing axis 200.

Figure 8:
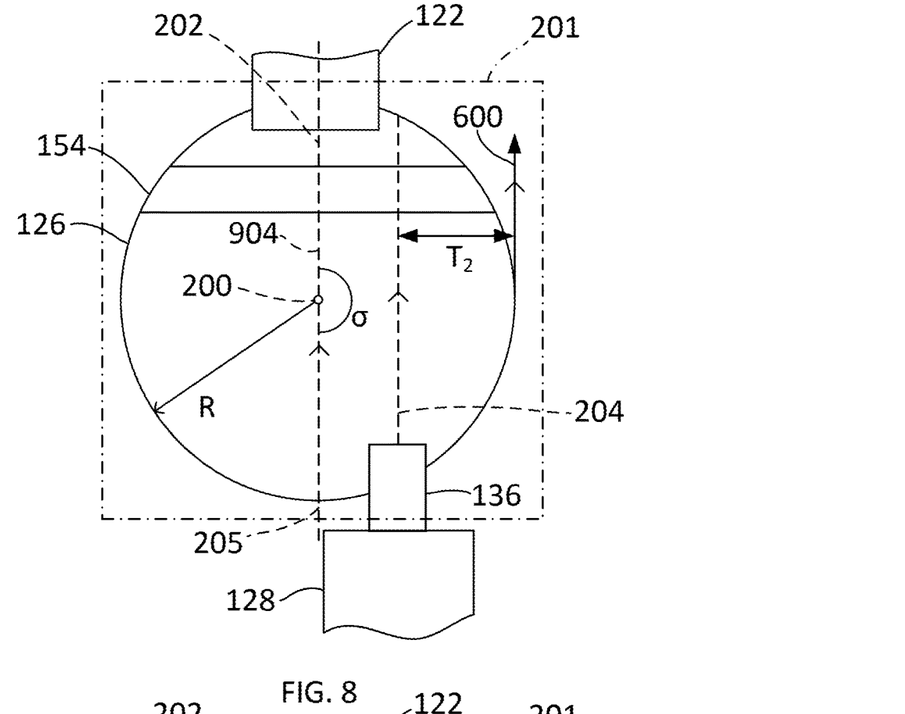
FIG. 8 is a cross-sectional view of an example injection housing of the exhaust gas aftertreatment system shown in FIG. 1, taken along plane A-A.

In some of these embodiments, such as is shown in FIG. 8, the bypass outlet conduit axis 202 is parallel to the injector axis 204 and the injector axis 204 is separated from the second tangent 600 by the second radial distance $T_2$.

Figure 9:
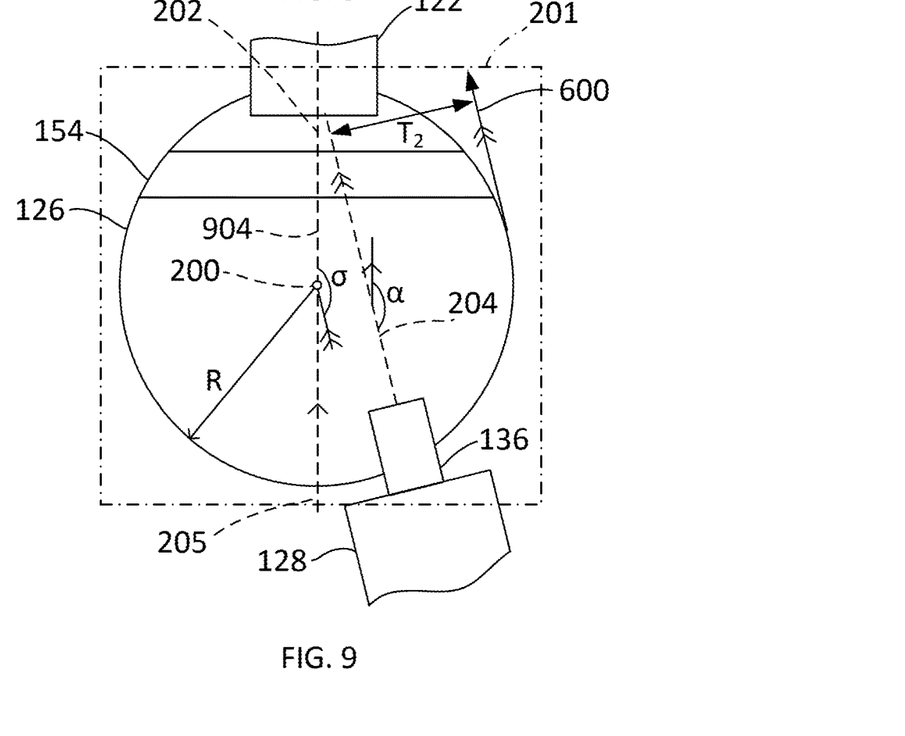
FIG. 9 is a cross-sectional view of an example injection housing of the exhaust gas aftertreatment system shown in FIG. 1, taken along plane A-A.

In others of these embodiments, such as is shown in FIG. 9, the injector axis 204 is separated from the bypass outlet conduit axis 202 by the radial angle α and from the second tangent 600 by the second radial distance $T_2$. The intersection between the injector axis 204 and the bypass outlet conduit axis 202 may occur within the injection housing 126 or outside of the injection housing 126.

Figure 10:
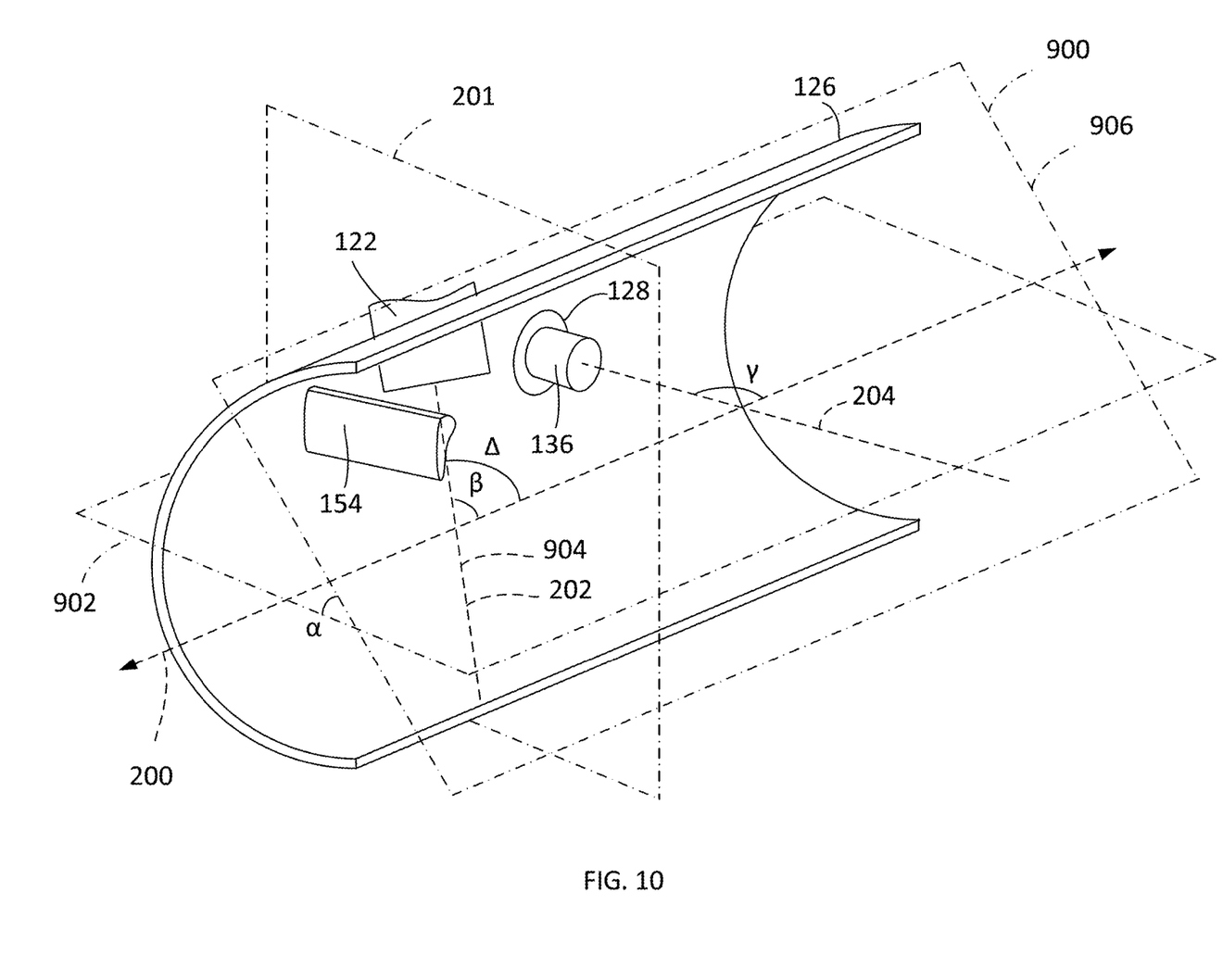
FIG. 10 is a cross-sectional view of an example injection housing of the exhaust gas aftertreatment system shown in FIG. 1, taken along plane A-A and plane B-B.

FIG. 10 illustrates a cross-sectional view of the injection housing 126 taken along plane A-A and plane B-B in FIG. 1, according to various embodiments. In addition to being variously angled and separated along the injection housing radial plane 201, the bypass outlet conduit axis 202 and the injector axis 204 may be variously angled and separated along the length of the injection housing 206 (e.g., along planes that are orthogonal to the injection housing radial plane 201 and along which the injection housing axis 200 extends, etc.).

The injection housing 126 is bisected by a bypass outlet conduit axial plane 900 along which the injection housing axis 200 extends, the bypass outlet conduit axis 202 extends, and which intersects the injection housing radial plane 201. The bypass outlet conduit axis 202 is separated from the injection housing axis 200 by a bypass outlet conduit axial angle β measured along the bypass outlet conduit axial plane 900. In various embodiments, the bypass outlet conduit axial angle β is less than 90°, or more than 90° and less than 180°. In some embodiments, the bypass outlet conduit axial angle β is between approximately (e.g., within 5% of, etc.) 25° and 89°, inclusive (e.g., including 25° and including 89°, etc.). In some embodiments, the bypass outlet conduit axial angle β is between 91° and 165°, inclusive (e.g., including 91° and including 165°, etc.). FIG. 10 illustrates the injection housing 126 with the bypass outlet conduit axial angle β being approximately equal to 75°. In other embodiments, the bypass outlet conduit axial angle β is 90°.

The injection housing 126 is also bisected by an injector axial plane 902 along which the injection housing axis 200 extends, the injector axis 204 extends, and which intersects the injection housing radial plane 201. The bypass outlet conduit axial plane 900 and the injector axial plane 902 are separated by the radial angle α along the injection housing radial plane 201. The injector axis 204 is separated from the injection housing axis 200 by an injector axial angle γ measured along the injector axial plane 902. In various embodiments, the injector axial angle γ is less than 90°, or more than 90° and less than 180°. In some embodiments, the injector axial angle γ is between approximately 25° and 89°, inclusive (e.g., including 25° and including 89°, etc.). In some embodiments, the injector axial angle γ is between 91° and 165°, inclusive (e.g., including 91° and including 165°, etc.). FIG. 10 illustrates the injection housing 126 with the injector axial angle γ being approximately equal to 110°. In other embodiments, the injector axial angle γ is 90°. In various embodiments, the bypass outlet conduit axis 202 and the injector axis 204 are parallel and the bypass outlet conduit axial angle β is equal to the injector axial angle γ.

Figure 11:
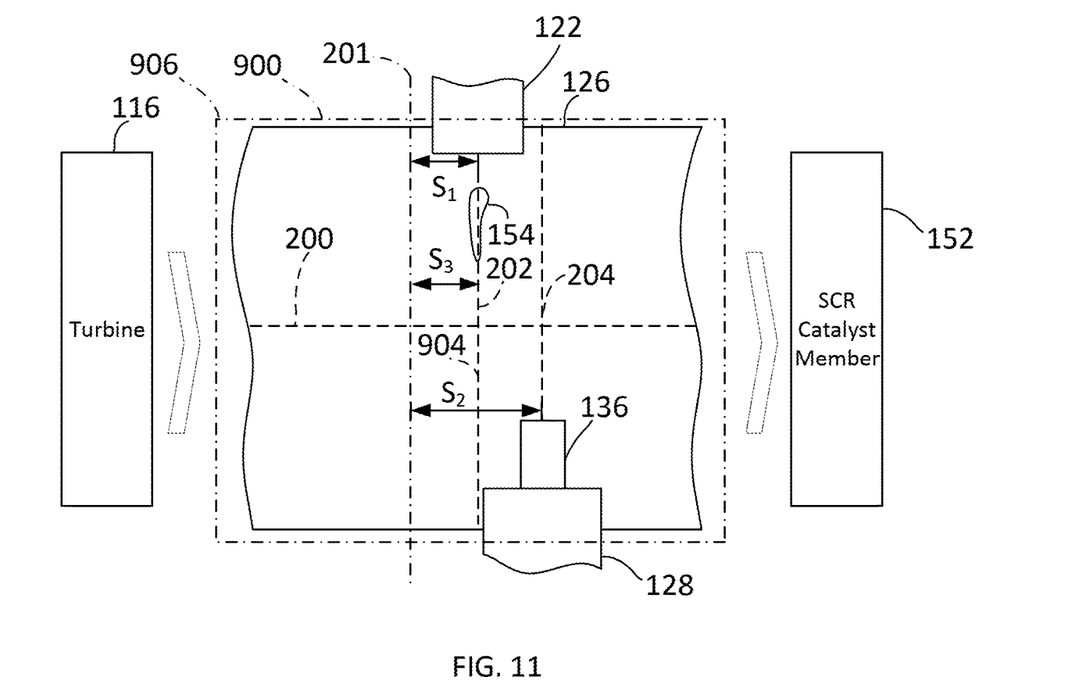
FIG. 11 is a cross-sectional view of an example injection housing of the exhaust gas aftertreatment system shown in FIG. 1, taken along plane B-B.
Figure 12:
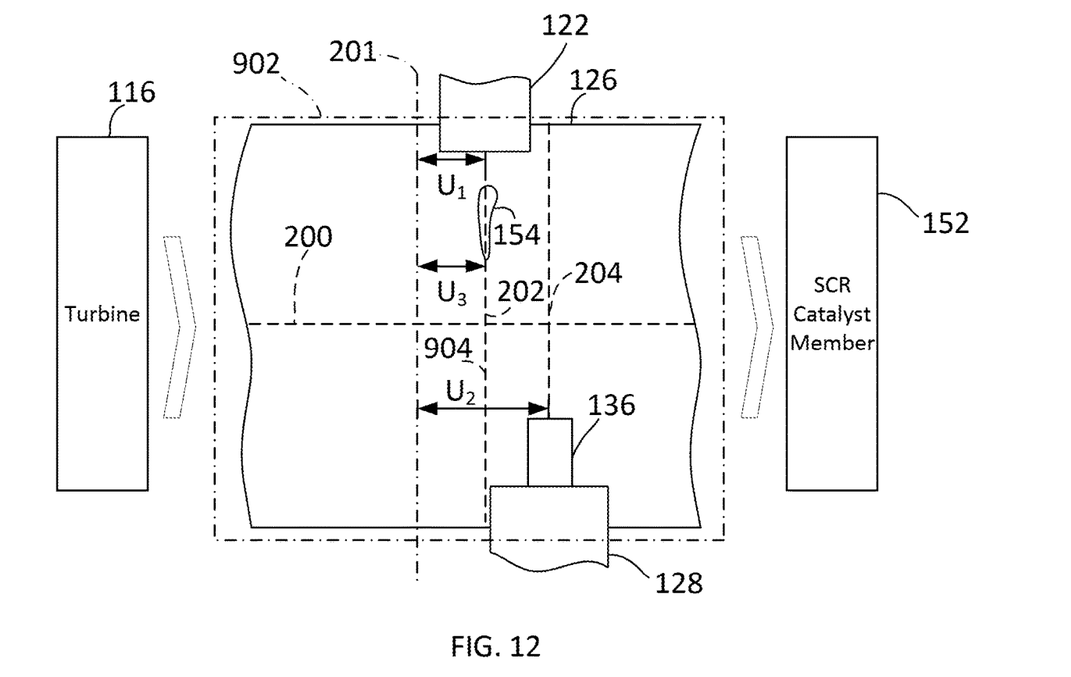
FIG. 12 is a cross-sectional view of an example injection housing of the exhaust gas aftertreatment system shown in FIG. 1, taken along plane B-B.

FIGS. 11 and 12 illustrate a cross-sectional view of the injection housing 126 taken along plane B-B in FIG. 1, according to various embodiments. The bypass outlet conduit 122 and the injector 136 can also be separated along the bypass outlet conduit axial plane 900 and/or the injector axial plane 902.

As shown in FIG. 11, the bypass outlet conduit 122 is separated from the injection housing radial plane 201 by a first bypass outlet conduit axial distance $S_1$ when measured along the bypass outlet conduit axial plane 900 and the injector 136 is separated from the injection housing radial plane 201 by a second bypass outlet conduit axial distance $S_2$ when measured along the bypass outlet conduit axial plane 900. In some embodiments, the first bypass outlet conduit axial distance $S_1$ is less than the second bypass outlet conduit axial distance $S_2$. In other embodiments, the first bypass outlet conduit axial distance $S_1$ is greater than the second bypass outlet conduit axial distance $S_2$. In still other embodiments, the first bypass outlet conduit axial distance $S_1$ is equal to the second bypass outlet conduit axial distance $S_2$.

As shown in FIG. 12, the bypass outlet conduit 122 is separated from the injection housing radial plane 201 by a first injector axial distance $U_1$ when measured along the injector axial plane 902 and the injector 136 is separated from the injection housing radial plane 201 by a second injector axial distance $U_2$ when measured along the injector axial plane 902. In some embodiments, the first injector axial distance $U_1$ is less than the second injector axial distance $U_2$. In other embodiments, the first injector axial distance $U_1$ is greater than the second injector axial distance $U_2$. In still other embodiments, the first injector axial distance $U_1$ is equal to the second injector axial distance $U_2$.

The flow guide 154 has an aerofoil shape when viewed in cross-section along the bypass outlet conduit axial plane 900. In various embodiments, the bypass outlet conduit axis 202 extends through the flow guide 154 and the injector axis 204 does not extend through the flow guide 154. In some embodiments, the bypass outlet conduit axis 202 and the injector axis 204 extend through the flow guide 154. In some embodiments, the injector axis 204 extends through the flow guide 154 and the bypass outlet conduit axis 202 does not extend through the flow guide 154.

The flow guide 154 is centered on a flow guide axis 904. The flow guide axis 904 is separated from the vertical axis 205 by a vertical offset angle $\mu$ that is measured about the injection housing axis 200 (e.g., with the injection housing axis 200 being the point along which an angular measurement is determined, etc.) when viewed along the injection housing axis 200 (e.g., when viewed in a cross-sectional view taken along the injection housing radial plane 201, when viewed in a cross-sectional view taken along a plane parallel to the injection housing radial plane 201, etc.). The vertical offset angle $\mu$ may be present regardless of whether or not the flow guide axis 904 and the injection housing axis 200 extend along the same plane, that plane being parallel to the injection housing radial plane 201. In various embodiments, the vertical offset angle $\mu$ is between 150 and 345°, inclusive. The vertical offset angle $\mu$ is defined such that a vertical offset angle $\mu$ of 0° corresponds with a location proximate a bottom surface of the injection housing 126, and a vertical offset angle $\mu$ of 180° corresponds with a location along a top surface of the injection housing 126 (e.g., opposite the bottom surface of the injection housing 126, etc.).

The injection housing 126 is also bisected by a flow guide axial plane 906 along which the injection housing axis 200 extends, the flow guide axis 904 extends, and which intersects the injection housing radial plane 201. In various embodiments, such as is shown in FIGS. 10 and 11, the flow guide axial plane 906 extends along the bypass outlet conduit axial plane 900.

The flow guide axis 904 is separated from the injection housing axis 200 by a flow guide axial angle $\Delta$ measured along the flow guide axial plane 906. In various embodiments, the flow guide axial angle $\Delta$ is less than 90°, or more than 90° and less than 180°. In some embodiments, the flow guide axial angle $\Delta$ is between approximately (e.g., within 5% of, etc.) 25° and 89°, inclusive (e.g., including 25° and including 89°, etc.). In some embodiments, the flow guide axial angle $\Delta$ is between 91° and 165°, inclusive (e.g., including 91° and including 165°, etc.). FIG. 10 illustrates the injection housing 126 with the flow guide axial angle $\Delta$ being approximately equal to 75°. In other embodiments, the flow guide axial angle $\Delta$ is 90°. In various embodiments, the bypass outlet conduit axis 202 and the flow guide axis 904 are parallel and the flow guide axial angle $\Delta$ is equal to the bypass outlet conduit axial angle $\beta$.

As shown in FIG. 11, the flow guide 154 is separated from the injection housing radial plane 201 by a third bypass outlet conduit axial distance $S_3$ when measured along the bypass outlet conduit axial plane 900. In some embodiments, the third bypass outlet conduit axial distance $S_3$ is less than the first bypass outlet conduit axial distance $S_1$. In other embodiments, the third bypass outlet conduit axial distance $S_3$ is greater than the first bypass outlet conduit axial distance $S_1$. In still other embodiments, the third bypass outlet conduit axial distance $S_3$ is equal to the first bypass outlet conduit axial distance $S_1$.

As shown in FIG. 12, the flow guide 154 is separated from the injection housing radial plane 201 by a third injector axial distance $U_3$ when measured along the injector axial plane 902. In some embodiments, the third injector axial distance $U_3$ is less than the first injector axial distance $U_1$. In other embodiments, the third injector axial distance $U_3$ is greater than the first injector axial distance $U_1$. In still other embodiments, the third injector axial distance $U_3$ is equal to the first injector axial distance $U_1$.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, exhaust gas, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. An exhaust gas system comprising:
   an engine-turbine exhaust gas conduit configured to receive exhaust gas from an engine;
   a turbocharger comprising a turbine coupled to the engine-turbine exhaust gas conduit;
   a turbine-housing exhaust gas conduit coupled to the turbine;
   an injection housing coupled to the turbine-housing exhaust gas conduit and centered on an injection housing axis;
   a dosing module coupled to the injection housing and comprising an injector configured to dose reductant into the injection housing, the injector centered on an injector axis; and
   a bypass system comprising:
      a bypass inlet conduit coupled to the engine-turbine exhaust gas conduit,
      a bypass valve coupled to the bypass inlet conduit, and
      a bypass outlet conduit coupled to the bypass valve and the injection housing, the bypass outlet conduit centered on a bypass outlet conduit axis;
   wherein the bypass outlet conduit axis does not intersect the injection housing axis; and
   wherein the injector axis and the bypass outlet conduit axis are separated by a radial angle that is less than 180° when viewed along the injection housing axis.

2. The exhaust gas system of claim 1, further comprising:
   a housing-catalyst exhaust gas conduit coupled to the injection housing; and
   a selective catalytic reduction (SCR) catalyst member coupled to the housing-catalyst exhaust gas conduit.

3. The exhaust gas system of claim 2, further comprising:
   a reductant pump configured to receive the reductant from a reductant source, the reductant pump coupled to the dosing module; and
   an air pump configured to receive air from an air source, the air pump coupled to the dosing module;
   wherein the dosing module is configured to mix the reductant received from the reductant pump with the air received from the air pump prior to providing the reductant to the injection housing.

4. The exhaust gas system of claim 1, wherein the bypass valve is operable between a first state in which the exhaust gas is able to flow from the bypass inlet conduit to the bypass outlet conduit and a second state in which the exhaust gas is prevented from flowing from the bypass inlet conduit to the bypass outlet conduit.

5. The exhaust gas system of claim 1, wherein the injector axis intersects the injection housing axis.

6. The exhaust gas system of claim 1, wherein the injector axis does not intersect the injection housing axis.

7. The exhaust gas system of claim 1, wherein:
   the injection housing axis is intersected by an injection housing radial plane that is orthogonal to the injection housing axis;
   the injection housing is bisected by a bypass outlet conduit axial plane along which the injection housing axis extends, the bypass outlet conduit axis extends, and which intersects the injection housing radial plane;
   the injection housing is also bisected by an injector axial plane along which the injection housing axis extends, the injector axis extends, and which intersects the injection housing radial plane; and
   the bypass outlet conduit axial plane is separated from the injector axial plane by the radial angle when viewed along the injection housing axis.

8. The exhaust gas system of claim 1, wherein:
   the bypass outlet conduit axis is separated from the injection housing axis by a bypass outlet conduit axial angle;
   the injector axis is separated from the injection housing axis by an injector axial angle; and
   at least one of: the bypass outlet conduit axial angle is less than 90°, the injector axial angle is less than 90°, the bypass outlet conduit axial angle is more than 90° and less than 180°, or the injector axial angle is more than 90° and less than 180°.

9. The exhaust gas system of claim 1, wherein:
   the injection housing axis is intersected by an injection housing radial plane that is orthogonal to the injection housing axis;
   the injection housing is bisected by a bypass outlet conduit axial plane along which the injection housing axis extends, the bypass outlet conduit axis extends, and which intersects the injection housing radial plane;

the injector is separated from the injection housing radial plane by a first bypass outlet conduit axial distance;

the bypass outlet conduit is separated from the injection housing radial plane by a second bypass outlet conduit axial distance less than the first bypass outlet conduit axial distance; and the injection housing radial plane is positioned between the injector and the turbine-housing exhaust gas conduit.

10. The exhaust gas system of claim 9, wherein:

the injection housing is also bisected by an injector axial plane along which the injection housing axis extends, the injector axis extends, and which intersects the injection housing radial plane;

the injector is separated from the injection housing radial plane by a first injector axial distance;

the bypass outlet conduit is separated from the injection housing radial plane by a second injector axial distance less than the first injector axial distance; and the injection housing radial plane is positioned between the injector and the turbine-housing exhaust gas conduit.

11. The exhaust gas system of claim 1, wherein:

the injection housing axis is intersected by a vertical axis that is orthogonal to the injection housing axis;

the vertical axis extends through a top surface of the injection housing; and the bypass outlet conduit axis is parallel to the vertical axis.

12. The exhaust gas system of claim 1, wherein:

the injection housing axis is intersected by a vertical axis that is orthogonal to the injection housing axis;

the vertical axis extends through a top surface of the injection housing; and the bypass outlet conduit axis is not parallel to the vertical axis.

13. An exhaust gas system comprising:

an engine-turbine exhaust gas conduit configured to receive exhaust gas;

a turbocharger comprising a turbine coupled to the engine-turbine exhaust gas conduit;

a turbine-housing exhaust gas conduit coupled to the turbine;

an injection housing coupled to the turbine-housing exhaust gas conduit and centered on an injection housing axis;

a dosing module coupled to the injection housing and comprising an injector configured to dose reductant into the injection housing, the injector centered on an injector axis; and a bypass system comprising:
 a bypass inlet conduit coupled to the engine-turbine exhaust gas conduit,
 a bypass valve coupled to the bypass inlet conduit, and
 a bypass outlet conduit coupled to the bypass valve and the injection housing, the bypass outlet conduit centered on a bypass outlet conduit axis;

wherein the injection housing axis is intersected by an injection housing radial plane that is orthogonal to the injection housing axis;

wherein the injection housing axis is intersected by a vertical axis that is orthogonal to the injection housing axis and extends along the injection housing radial plane;

wherein the injector axis is separated from the vertical axis by a vertical offset angle measured about the injection housing axis, when viewed along the injection housing axis; and wherein the vertical offset angle is between 45° and 180°, inclusive.

14. The exhaust gas system of claim 13, wherein the vertical offset angle is defined such that a top surface of the injection housing is separated by 0° from the vertical axis.

15. The exhaust gas system of claim 13, wherein the injection housing comprises a flow guide disposed proximate the bypass outlet conduit and having an aerofoil shape when viewed along a bypass outlet conduit axial plane along which the bypass outlet conduit axis extends and the injection housing axis extends.

16. The exhaust gas system of claim 13, further comprising:

a housing-catalyst exhaust gas conduit coupled to the injection housing; and a selective catalytic reduction (SCR) catalyst member coupled to the housing-catalyst exhaust gas conduit.

17. The exhaust gas system of claim 16, further comprising:

a reductant pump configured to receive the reductant from a reductant source, the reductant pump coupled to the dosing module; and an air pump configured to receive air from an air source, the air pump coupled to the dosing module;

wherein the dosing module is configured to mix the reductant received from the reductant pump with the air received from the air pump prior to providing the reductant to the injection housing.

18. The exhaust gas system of claim 13, wherein the bypass valve is operable between a first state in which the exhaust gas is able to flow from the bypass inlet conduit to the bypass outlet conduit and a second state in which the exhaust gas is prevented from flowing from the bypass inlet conduit to the bypass outlet conduit.

19. The exhaust gas system of claim 13, wherein:

the injector axis and the bypass outlet conduit axis are separated by a radial angle that is less than 180° when viewed along the injection housing axis;

the injection housing is bisected by a bypass outlet conduit axial plane along which the injection housing axis extends, the bypass outlet conduit axis extends, and which intersects the injection housing radial plane;

the injection housing is also bisected by an injector axial plane along which the injection housing axis extends, the injector axis extends, and which intersects the injection housing radial plane; and the bypass outlet conduit axial plane is separated from the injector axial plane by the radial angle when viewed along the injection housing axis.

20. An exhaust gas system comprising:

an engine-turbine exhaust gas conduit configured to receive exhaust gas from an engine;

a turbocharger comprising a turbine coupled to the engine-turbine exhaust gas conduit;

a turbine-housing exhaust gas conduit coupled to the turbine;

an injection housing coupled to the turbine-housing exhaust gas conduit and centered on an injection housing axis;

a dosing module coupled to the injection housing and comprising an injector configured to dose reductant into the injection housing, the injector centered on an injector axis; and a bypass system comprising:
- a bypass inlet conduit coupled to the engine-turbine exhaust gas conduit,
- a bypass valve coupled to the bypass inlet conduit, and
- a bypass outlet conduit coupled to the bypass valve and the injection housing, the bypass outlet conduit centered on a bypass outlet conduit axis;

wherein the bypass outlet conduit axis does not intersect the injection housing axis;

wherein the injection housing axis is intersected by an injection housing radial plane that is orthogonal to the injection housing axis and positioned between the injector and the turbine-housing exhaust gas conduit;

wherein the injection housing is bisected by a bypass outlet conduit axial plane along which the injection housing axis extends, the bypass outlet conduit axis extends, and which intersects the injection housing radial plane;

wherein the injector is separated from the injection housing radial plane by a first bypass outlet conduit axial distance; and wherein the bypass outlet conduit is separated from the injection housing radial plane by a second bypass outlet conduit axial distance less than the first bypass outlet conduit axial distance.

21. The exhaust gas system of claim 20, wherein:

the injection housing is also bisected by an injector axial plane along which the injection housing axis extends, the injector axis extends, and which intersects the injection housing radial plane;

the injector is separated from the injection housing radial plane by a first injector axial distance;

the bypass outlet conduit is separated from the injection housing radial plane by a second injector axial distance less than the first injector axial distance; and the injection housing radial plane is positioned between the injector and the turbine-housing exhaust gas conduit.

22. An exhaust gas system comprising:

an engine-turbine exhaust gas conduit configured to receive exhaust gas from an engine;

a turbocharger comprising a turbine coupled to the engine-turbine exhaust gas conduit;

a turbine-housing exhaust gas conduit coupled to the turbine;

an injection housing coupled to the turbine-housing exhaust gas conduit and centered on an injection housing axis;

a dosing module coupled to the injection housing and comprising an injector configured to dose reductant into the injection housing, the injector centered on an injector axis; and a bypass system comprising:
- a bypass inlet conduit coupled to the engine-turbine exhaust gas conduit,
- a bypass valve coupled to the bypass inlet conduit, and
- a bypass outlet conduit coupled to the bypass valve and the injection housing, the bypass outlet conduit centered on a bypass outlet conduit axis;

wherein the bypass outlet conduit axis does not intersect the injection housing axis;

wherein the injection housing axis is intersected by a vertical axis that is orthogonal to the injection housing axis;

wherein the vertical axis extends through a top surface of the injection housing; and wherein the bypass outlet conduit axis is parallel to the vertical axis.

23. An exhaust gas system comprising:

an engine-turbine exhaust gas conduit configured to receive exhaust gas from an engine;

a turbocharger comprising a turbine coupled to the engine-turbine exhaust gas conduit;

a turbine-housing exhaust gas conduit coupled to the turbine;

an injection housing coupled to the turbine-housing exhaust gas conduit and centered on an injection housing axis;

a dosing module coupled to the injection housing and comprising an injector configured to dose reductant into the injection housing, the injector centered on an injector axis; and a bypass system comprising:
- a bypass inlet conduit coupled to the engine-turbine exhaust gas conduit,
- a bypass valve coupled to the bypass inlet conduit, and
- a bypass outlet conduit coupled to the bypass valve and the injection housing, the bypass outlet conduit centered on a bypass outlet conduit axis;

wherein the bypass outlet conduit axis does not intersect the injection housing axis;

wherein the injection housing axis is intersected by a vertical axis that is orthogonal to the injection housing axis;

wherein the vertical axis extends through a top surface of the injection housing; and wherein the bypass outlet conduit axis is not parallel to the vertical axis.

* * * * *